United States Patent
Manadhata et al.

(10) Patent No.: US 11,122,064 B2
(45) Date of Patent: Sep. 14, 2021

(54) UNAUTHORIZED AUTHENTICATION EVENT DETECTION

(71) Applicant: ENTIT SOFTWARE LLC, Sanford, NC (US)

(72) Inventors: Pratyusa K. Manadhata, Sacramento, CA (US); Mijung Kim, Sunnyvale, CA (US)

(73) Assignee: MICRO FOCUS LLC, Santa Clara, CA (US)

( * ) Notice: Subject to any disclaimer, the term of this patent is extended or adjusted under 35 U.S.C. 154(b) by 343 days.

(21) Appl. No.: 15/959,461

(22) Filed: Apr. 23, 2018

(65) Prior Publication Data

US 2019/0327253 A1 Oct. 24, 2019

(51) Int. Cl.
| | |
|---|---|
| *H04L 29/06* | (2006.01) |
| *G06K 9/62* | (2006.01) |
| *G06F 21/31* | (2013.01) |
| *G06F 21/55* | (2013.01) |
| *G06F 21/45* | (2013.01) |
| *G06N 20/00* | (2019.01) |

(52) U.S. Cl.
CPC ........ *H04L 63/1425* (2013.01); *G06F 21/316* (2013.01); *G06F 21/45* (2013.01); *G06F 21/554* (2013.01); *G06K 9/6256* (2013.01); *G06K 9/6277* (2013.01); *H04L 63/08* (2013.01); *H04L 63/1441* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 7,376,969 B1 | 5/2008 | Njemanze | |
| 7,889,666 B1 * | 2/2011 | Pei | H04L 41/065 370/242 |
| 8,464,279 B2 * | 6/2013 | Gutjahr | H04L 41/065 719/318 |
| 8,490,162 B1 * | 7/2013 | Popoveniuc | H04L 63/08 726/5 |
| 8,776,190 B1 * | 7/2014 | Cavage | G06F 21/33 726/5 |
| 8,910,188 B1 | 12/2014 | Wang | |

(Continued)

FOREIGN PATENT DOCUMENTS

WO WO-2017037444 A1 3/2017

OTHER PUBLICATIONS

Aruba, UEBA Use Case, Compromised User and Host Detection using Behavioral Analytics dated on or before Feb. 23, 2018 (7 pages).

(Continued)

*Primary Examiner* — Michael W Chao (57) ABSTRACT

In some examples, a system identifies, for a given authentication event between a plurality of devices in a network, a context comprising a set of authentication events that are temporally related to the given authentication event. The set of authentication events occur at the devices. A classifier is applied on a collection of features associated with the set of authentication events, the collection of features comprising a number of machines or a number of users associated with the set of authentication events. The system determines, based on an output of the classifier, whether the given authentication event is an unauthorized authentication event.

18 Claims, 4 Drawing Sheets

(56) References Cited

U.S. PATENT DOCUMENTS

| | | | |
|---|---|---|---|
| 8,966,036 B1* | 2/2015 | Asgekar | G06Q 50/01 |
| | | | 707/706 |
| 9,378,361 B1 | 6/2016 | Yen et al. | |
| 9,591,006 B2 | 3/2017 | Siva Kumar et al. | |
| 9,667,641 B2 | 5/2017 | Muddu et al. | |
| 9,679,125 B2 | 6/2017 | Bailor | |
| 9,690,933 B1 | 6/2017 | Singh | |
| 9,881,179 B2 | 1/2018 | Patton | |
| 9,911,290 B1 | 3/2018 | Zalewski | |
| 9,985,984 B1 | 5/2018 | Chavez | |
| 10,104,102 B1* | 10/2018 | Neumann | H04L 63/1416 |
| 10,120,746 B1* | 11/2018 | Sharifi Mehr | H04L 63/1425 |
| 10,257,227 B1* | 4/2019 | Stickle | G06F 21/554 |
| 1,028,981 A1 | 5/2019 | Stavrou | |
| 10,298,444 B2 | 5/2019 | Bishnoi | |
| 10,356,107 B1* | 7/2019 | Kent | H04L 67/22 |
| 10,375,095 B1* | 8/2019 | Turcotte | H04L 67/42 |
| 10,581,886 B1* | 3/2020 | Sharifi Mehr | H04L 63/1416 |
| 10,587,633 B2* | 3/2020 | Muddu | G06N 7/005 |
| 10,771,486 B2* | 9/2020 | Murphey | H04L 63/1416 |
| 2003/0101359 A1* | 5/2003 | Aschen | H04L 63/1408 |
| | | | 726/23 |
| 2004/0221163 A1 | 11/2004 | Jorgensen | |
| 2005/0005202 A1* | 1/2005 | Burt | G06Q 10/10 |
| | | | 714/47.3 |
| 2005/0015624 A1* | 1/2005 | Ginter | H04L 63/20 |
| | | | 726/4 |
| 2005/0262343 A1 | 11/2005 | Jorgensen | |
| 2006/0112039 A1 | 5/2006 | Wang | |
| 2008/0184371 A1* | 7/2008 | Moskovitch | G06F 21/566 |
| | | | 726/24 |
| 2009/0099988 A1 | 4/2009 | Stokes | |
| 2010/0095374 A1* | 4/2010 | Gillum | G06Q 30/02 |
| | | | 726/22 |
| 2010/0312877 A1* | 12/2010 | Xie | H04L 63/1408 |
| | | | 709/224 |
| 2011/0302653 A1 | 12/2011 | Frantz | |
| 2011/0320816 A1 | 12/2011 | Yao | |
| 2012/0191630 A1 | 7/2012 | Breckenridge | |
| 2012/0290879 A1 | 11/2012 | Shibuya | |
| 2013/0139179 A1 | 5/2013 | Roll | |
| 2014/0181968 A1 | 6/2014 | Ge | |
| 2014/0245439 A1 | 8/2014 | Day | |
| 2015/0128267 A1* | 5/2015 | Gupta | H04L 63/145 |
| | | | 726/23 |
| 2015/0161237 A1 | 6/2015 | Agarwal | |
| 2016/0006730 A1 | 1/2016 | Chari | |
| 2016/0026656 A1 | 1/2016 | Mansour | |
| 2016/0034361 A1* | 2/2016 | Block | H04L 63/1416 |
| | | | 714/4.12 |
| 2016/0034712 A1 | 2/2016 | Patton | |
| 2016/0112287 A1* | 4/2016 | Farmer | H04L 43/04 |
| | | | 709/224 |
| 2016/0224618 A1 | 8/2016 | Robichaud | |
| 2016/0300059 A1* | 10/2016 | Abrams | G06F 21/554 |
| 2016/0308884 A1* | 10/2016 | Kent | G06K 9/6277 |
| 2016/0308898 A1 | 10/2016 | Teeple | |
| 2016/0335425 A1 | 11/2016 | Liu | |
| 2016/0337385 A1 | 11/2016 | Fujishima | |
| 2016/0357301 A1 | 12/2016 | Padiri | |
| 2017/0063886 A1 | 3/2017 | Muddu et al. | |
| 2017/0063909 A1 | 3/2017 | Muddu | |
| 2017/0063910 A1* | 3/2017 | Muddu | H04L 43/062 |
| 2017/0093902 A1* | 3/2017 | Roundy | G06F 21/552 |
| 2017/0093910 A1 | 3/2017 | Gukai | |
| 2017/0134362 A1* | 5/2017 | Randall | H04L 63/083 |
| 2017/0230408 A1* | 8/2017 | Ahmed | H04L 63/1441 |
| 2017/0272521 A1 | 9/2017 | Takahashi | |
| 2017/0277727 A1 | 9/2017 | Chen | |
| 2017/0302685 A1* | 10/2017 | Ladnai | H04L 63/1433 |
| 2017/0351739 A1 | 12/2017 | Zou | |
| 2018/0004948 A1* | 1/2018 | Martin | H04L 63/1425 |
| 2018/0027006 A1 | 1/2018 | Zimmermann et al. | |
| 2018/0069893 A1 | 3/2018 | Amit | |
| 2018/0124082 A1* | 5/2018 | Siadati | H04L 63/1425 |
| 2018/0314742 A1 | 11/2018 | Taropa | |
| 2018/0316704 A1* | 11/2018 | Joseph Durairaj | G06F 21/554 |
| 2019/0026459 A1* | 1/2019 | Harutyunyan | G06F 21/552 |
| 2019/0036971 A1 | 1/2019 | Ford | |
| 2019/0068627 A1* | 2/2019 | Thampy | H04L 63/1425 |
| 2019/0098037 A1* | 3/2019 | Shenoy, Jr. | H04W 12/12 |
| 2019/0173893 A1* | 6/2019 | Muddu | H04L 43/045 |
| 2019/0190936 A1* | 6/2019 | Thomas | H04L 63/1425 |
| 2019/0266325 A1* | 8/2019 | Scherman | G06F 21/554 |
| 2020/0076837 A1* | 3/2020 | Ladnai | H04L 63/1425 |

OTHER PUBLICATIONS

Chawla et al., SMOTE: Synthetic Minority Over-Sampling Technique published Jun. 2002 (37 pages).
Kim et al., U.S. Appl. No. 15/689,045 entitled Extracting Features for Authentication Events filed Aug. 29, 2017 (36 pages).
Manadhata et al., U.S. Appl. No. 15/689,043 entitled Unauthorized Authentication Events filed Aug. 29, 2017 (26 pages).
Marwah et al., U.S. Appl. No. 15/689,047 entitled Training Models Based on Balanced Training Data Sets filed Aug. 29, 2017 (36 pages).
Mike Scutt, Information Security, Rapid7 Community and Blog, Introspective Intelligence: What Makes Your Network Tick, What Makes it Sick? Nov. 17, 2016 (5 pages).
Mobin Javed, Detecting Credential Compromise in Enterprise Networks, Electrical Engineering and Computer Sciences, University of California at Berkeley, Dec. 16, 2016 (90 pages).
Musthaler et al., Fortscale's user behavioral analytics solution provides full context when truly malicious behavior is detected, Jan. 2016 (5 pages).
RAPID7 —Detecting Lateral Movement with Windows Event Logs downloaded Jul. 31, 2017 (4 pages).
RAPID7, Technical Primer, (unaged Detection and Response downloaded Jul. 31, 2017 (4 pages).
Rod Soto. Dynamic Population Discovery for Laternal Movement (Using Machine Learning), https://www.slideshare.net/RodSoto2/dynamic-population-discovery-for-lateral-movement-using-machine-learning downloaded Jul. 19, 2017 (101 pages).
Siadati et al., Detecting Malicious Logins in Enterprise Networks Using Visualization, IEEE 2016 (8 pages).
Siadati et al., Detecting Structurally Anomalous Logins Within Enterprise Networks, CCS'17, Oct. 30-Nov. 3, 2017 (12 pages).
STRATA-v4 https://www.slideshare.net/RamShankarSivaKumar/strata-2015-presentation-detecting-lateral-movement, downloaded Jul. 19, 2017 (34 pages).
Vectra Networks, The Data Science Behind Vectra Threat Detections—https://yellowcube.eu/wp-content/uploads/2017/06/the-data-science-behind-vectra-threat-detections.pdf, 2016 (10 pages).
Vectra Networks. White Paper, Detect Insider Attacks in Real Time https://yellowcube.eu/wp-content/uploads/2017/06/wp-insider-threat-detection.pdf, 2017 (6 pages).
Wikipedia, Gradient Boosting last edited Jul. 28, 2017 (10 pages).
Wikipedia, Random forest last edited Jul. 23, 2017 (10 pages).
Alariki et al., Features Extraction Scheme for Behavioural Biometric Authentication in Touchscreen Mobile Devices, ISSN 0973-4562, vol. 11, No. 18 (2016); No. of pp. 14.
Chebrolu et al.; Feature deduction and ensemble design of intrusion detection systems; 2005; Elsevier, Computers & Security 24; pp. 1-13, as printed. (Year: 2005).
Feng et al; Security after Login: Identity Change Detection on Smartphones Using Sensor Fusion, Aug. 27 (Year: 2015) (6 pages).
Jakobsson et al, Implicit Authentication for Mobile Devices, (Year: 2009) (6 pages).
Kent et al, Differentiating User Authentication Graphs, Jul. 22 (Year: 2013) (4 pages).
Rybnik, et al., A Keystroke Dynamics Based System for User Identification, Jul. 9 (Year: 2008) (6 pages).

* cited by examiner

UNAUTHORIZED AUTHENTICATION EVENT DETECTION

BACKGROUND

To gain access to a network, a user may use a credential such as a username and password, a certificate, a security key, and so forth. User credentials can be stolen by an unauthorized entity. For example, a user may disclose the user's credential to the unauthorized entity, which may be masquerading as a legitimate service. Alternatively, the unauthorized entity may include malware that can track a user's inputs to extract a credential entered by the user, or can access stored information to retrieve the credential.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Once an unauthorized entity has obtained (stolen) a user's credential, the unauthorized entity can move within a network. The movement of the unauthorized entity within the network using a (stolen) valid credential is referred to as lateral movement. By performing lateral movement, the unauthorized entity seeks to find other vulnerable users (to obtain credentials of such other users or to obtain sensitive information belonging to such other users), vulnerable devices, and sensitive information. With the stolen credential, the unauthorized entity can also access devices in the network to obtain information stored by or accessible by such devices, or to use resources of the devices. Devices in the network may store sensitive information, or can have access to information that ultimately allows the unauthorized entity to access a data repository containing sensitive information. Sensitive information can refer to financial information, technical information, or any other information that an enterprise or individual wishes to protect against disclosure to unauthorized entities (users, programs, or machines).

Because lateral movement involves the access of users or devices by an unauthorized entity based on use of a valid credential, traditional security mechanisms, such as malware detectors, may not be able to detect the unauthorized use of the credential. For example, traditional security mechanisms may not be able to distinguish between a user's authorized use of the user's own credential and an unauthorized entity's use of the same credential after stealing it.

In accordance with some implementations of the present disclosure, a machine-learning based approach is used to distinguish unauthorized authentication events (that use stolen or compromised credentials) from benign authentication events (which are authentication events by authorized entities). For a given authentication event between multiple devices in a network, a system according to some implementations of the present disclosure identifies a set of authentication events at the devices, where the identified set of authentication events are temporally related to the given authentication event.

To detect unauthorized authentication events (also referred to as detecting lateral movement or detecting a stolen credential), a classifier can be trained using a training data set. A classifier can also be referred to as a machine-learning model. A training data set refers to collections of features (sometimes arranged as feature vectors), where each collection of features is assigned a label indicating whether or not the collection of features is indicative of an unauthorized authorization event. A positive label specifies that the collection of features is indicative of unauthorized authentication event, while a negative label specifies that the collection of features is not indicative of an unauthorized authentication event.

A "feature" can refer to any characteristic that is extracted from event data associated with a given authentication event. The feature can include an attribute retrieved from the event data, or an attribute computed based on the event data. In either case, the feature is considered to be extracted from event data.

Once the classifier is trained, the classifier is applied on a collection of features (e.g., a feature vector) associated with authentication events, where the authentication events can include the given authentication event as well as the set of authentication events that are temporally related to the given authentication event. A classifier applied on a collection of features can refer to any of: (1) one classifier applied on the collection of features, or (2) one classifier applied on multiple collections of features, or (3) multiple classifiers applied on one collection of features, or (4) multiple classifiers applied on multiple collections of features. The system determines, based on an output of the classifier, whether the given authentication event is an unauthorized authentication event associated with lateral movement (or stolen credential).

An authentication event is generated when a user or program at a first (source) device in a network attempts to log into a second (destination) device in the network by offering a user's credential to the second device. In some examples, a credential can include a combination of a username and a password, a security certificate, a security key, or any other information that can be used to determine whether the user or the program at the first device is authorized to access the second device.

A network can log authentication events by storing information relating to authentication events into a data repository. For a given authentication event between a plurality of devices in a network, techniques or mechanisms according to some implementations of the present disclosure can identify a context that includes a set of authentication events (at the devices) that are temporally related to the given authentication event. The given authentication event can have a given timestamp. Another authentication event is associated with the given authentication event if the other authentication event occurred at a source device or a destination device and has a timestamp that is within a time window that includes the timestamp of the given authentication event.

For ease of implementation, the context can exclude certain other information, such as Domain Name System (DNS) events, netflow events, and other events. By not relying on other information such as information of DNS events netflow events, and other events, a classifier for identifying unauthorized authentication events does not have to rely on information that may not be collected in networks of some enterprises. As a result, to use unauthorized authentication event identification techniques or mechanisms according to some implementations, such enterprises would not have to first invest in additional equipment or programs to enable the logging of event data other than authentication events.

DNS events include events associated with performing a DNS lookup, in which a device issues a DNS query to determine a network address (e.g., an Internet Protocol (IP) address) assigned to a domain name of the device. For example, the source device can issue a DNS lookup to the destination device or another device. Alternatively, the destination device can issue a DNS lookup to the source device or another device. DNS events also include DNS responses to DNS queries, where a DNS response contains the network address identified by a device (e.g., a DNS server) in response to a domain name in a DNS query.

Netflow events can include events related to transfer of data between devices, such as between the source and destination devices, or between a source or destination device and a different device.

In some examples, other types of event data that classifiers according to some implementations do not have to rely upon include security events. A security event can be any event that triggers a security action at the device. For example, the device may include a malware detector that detects suspicious activities at the device caused by a virus or other malware, which can trigger the malware detector to issue a security alert or to take other action, such as to quarantine a process or to stop a process. Examples of other security events include an alert issued by an intrusion detection system (which has detected intrusion into a device or network), a firewall alert issued by a firewall, and so forth.

In further examples, other types of event data that classifiers according to some implementations do not have to rely upon include Hypertext Transfer Protocol (HTTP) events. An HTTP event can include an HTTP request issued by a device. An HTTP request can be issued by a device to obtain information of another device. Thus, for example, the source device can issue an HTTP request to the destination device, or alternatively, the source device or destination device can issue an HTTP request to a different device. The device receiving the HTTP request can issue an HTTP response, which is another HTTP event.

The classifier can be applied on a collection of features associated with the context, and an output of the classifier can be used to determine whether a given authentication event is an unauthorized authentication event.

Figure 1:
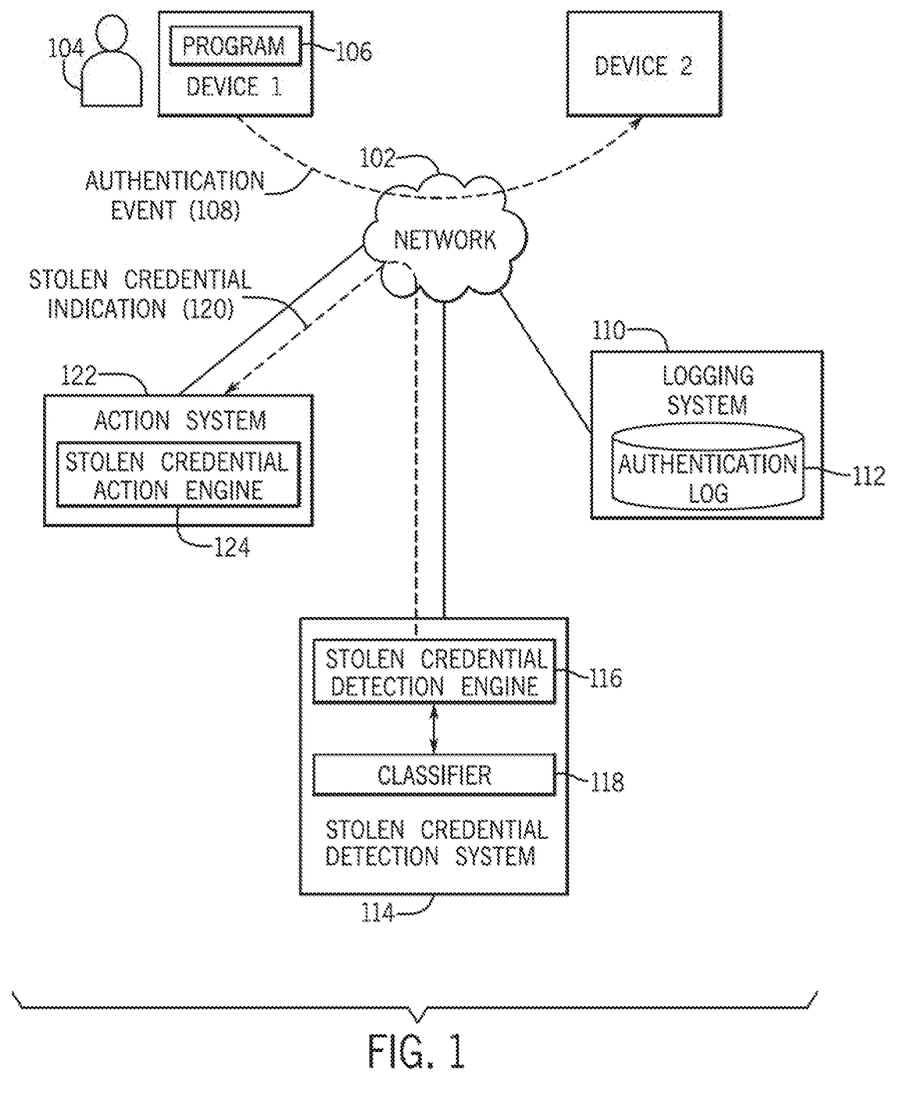
FIG. 1 is a block diagram of an arrangement that includes devices coupled over a network, and a stolen credential detection system according to some examples.

FIG. 1 shows an example where device 1 is coupled over a network 102 to device 2. The network 102 can include a wired network, a wireless network, or a combination of wired and wireless networks. Although just two devices as shown in FIG. 1, it is noted that a network arrangement can include more than two devices. Examples of devices include any or some combination of the following: a desktop computer, a notebook computer, a tablet computer, a smartphone, a server computer, a storage system, a communication node, or any other device that is capable of communicating over the network 102.

The devices can be part of an enterprise network, which is accessible by users of an enterprise (e.g., a company, a government agency, an educational organization, etc.). In other examples, the network 102 (or a portion of the network 102) can be a public network, such as the Internet.

A user 104 or a program 106 at device 1 can initiate an authentication event 108 with device 2. For example, the user 104 can type in the user's credential, or the user can use a security device (e.g., a badge, a smartphone, a wearable device such as a smart watch, smart eyeglasses, a head-mounted device, etc.) that stores a credential that can be communicated from the security device to device 1, such as by using a wireless connection (e.g., a Bluetooth link, a Wi-Fi link, a radio frequency identification (RFID) link, etc.). In another example, the user 104 at device 1 can attempt to authenticate a different user to device 2. The program 106, which includes machine-readable instructions, can include an application program, an operating system, and so forth. The program 106 can similarly provide a user's credential to initiate the authentication event 108.

In some examples, a logging system 110 can log event data of the authentication event 108 in an authentication log 112, which can store various attributes off the authentication event 108. Examples of attributes in event data of an authentication event include any or some combination of the following: a timestamp (which indicates the time at which the authentication event 108 occurred), an identifier of an initiating user that initiated the authentication event 108 (the initiating user is already authenticated on the source device, and the initiating user wants to authenticate to the destination device—the initiating user wants to authenticate himself/herself, or authenticate a different user), an identifier of a destination user to be authenticated on a destination device (the destination user can be the same as the initiating user), an identifier of the source device (e.g., device 1), an identifier of a destination device (e.g., device 2), a type of authentication, a success/failure indication of the authentication event, and so forth. The authentication log 112 can store event data of multiple authentication events among various devices that communicate over the network 102.

The authentication log 112 can refer to a data repository (or multiple data repositories) to store event data. The authentication log 112 can be stored on a storage device or a collection of storage devices.

In addition to logging event data of authentication events, the logging system 110 can also store event data of associated authentication events in the authentication log 112. In some examples, an associated authentication event (that is associated with a given authentication event) is an authentication event that is temporally related to the given authentication event. For example, the given authentication event can have a given timestamp. Authentication events are associated with the given authentication event if the authentication events occurred at a source device or a destination device and have timestamps within a time window that includes the timestamp of the given authentication event.

FIG. 1 also shows a stolen credential detection system 114 that is connected to the network 102. The stolen credential detection system 114 is able to access the authentication log 112 over the network 102 to determine whether any given authentication event is an unauthorized authentication event. The stolen credential detection system 114 includes a stolen credential detection engine 116 and a classifier 118 that can be applied on features extracted from a context of a given authentication event, where the context includes the given authentication event and associated authentication events (that are temporally related to the given authentication event) to determine whether the given authentication event is an unauthorized authentication event.

As used here, an "engine" can refer to a hardware processing circuit, which can include any or some combination of the following: a microprocessor, a core of a multi-core microprocessor, a microcontroller, a programmable gate array, a programmable integrated circuit device, or any other hardware processing circuit.

The classifier 118 can be trained by the stolen credential detection system 114 and can be applied on features extracted from a context of a given authentication event to determine whether the given authentication event is an unauthorized authentication event. Although just one classifier 118 is shown in FIG. 1, it is noted that the stolen credential detection system 114 can use multiple classifiers (as part of an ensemble of classifiers) for application on features extracted from a context of an authentication event.

If a stolen credential is detected, the stolen credential detection engine 116 can output a stolen credential indication 120 over the network 102 to an action system 122, which includes a stolen credential action engine 124. The stolen credential action engine 124 can automatically take action to address the detected stolen credential, in response to the stolen credential indication 120. For example, the stolen credential action engine 124 can establish a communication with device 1, device 2, or both devices 1 and 2, to cause the device(s) to halt or stop any further activity (e.g., restrict the device(s) from communicating over the network 102 and/or restrict the device(s) from processing events, accessing data, and so forth). As more specific examples, the stolen credential action engine 124 can shut down processes (e.g., processes of a program or multiple programs) at device 1 and/or device 2 to prevent unauthorized access of information or resources at device 1 and/or device 2. In other examples, the stolen credential action engine 124 can take other actions, including sending a notification of the detected stolen credential to an administrator or other user, or triggering other security responses to the detected stolen credential.

By using a classifier 118 that is trained, the detection of a stolen credential is based on the intuition that authentication events surrounding a normal (benign) authentication event differs from authentication events surrounding an unauthorized authentication event. For example, consider an authentication event AE from a source device S to a destination device D at time T. If the authentication event AE is malicious, then an attacker may have established a foothold on source device S and may have conducted several authentication activities on source device S most of which may have failed. Then at some point, the authentication event AE happens and the attacker authenticates to destination device D. After the authentication, the attacker may conduct further malicious activities on destination device D.

Figure 2:
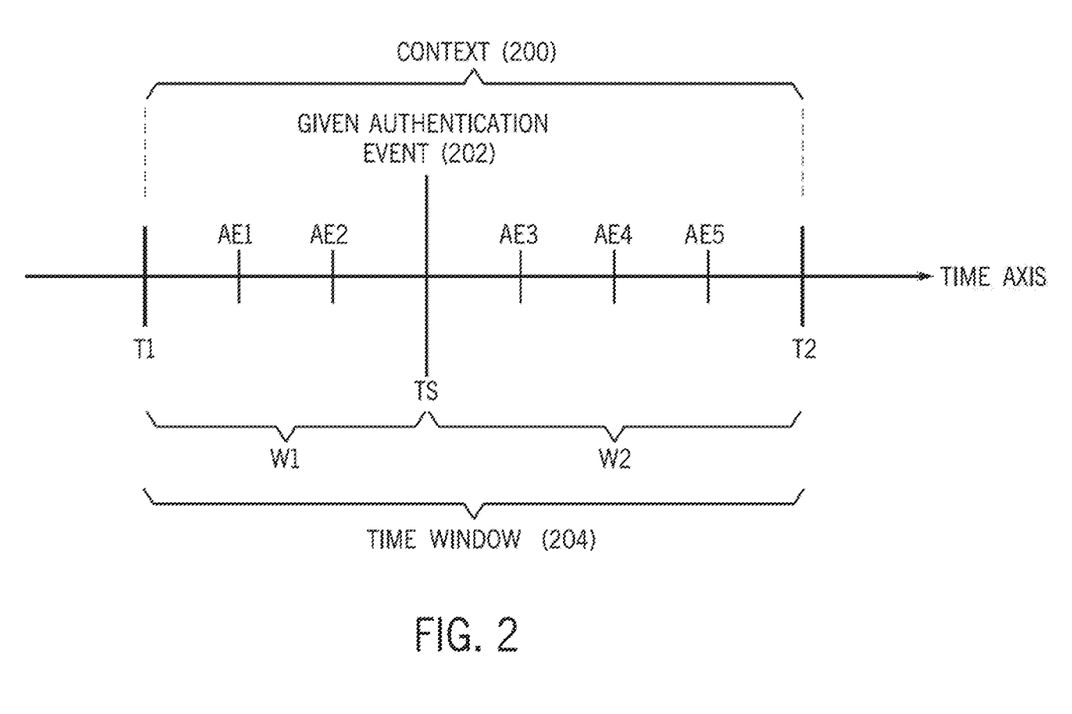
FIG. 2 shows an example context of an authentication event derived according to some examples.

FIG. 2 shows an example of how a context 200 for a given authentication event 202 is determined. The given authentication event 202 occurred at time TS, as represented by the timestamp of the event data representing the given authentication event 202. A time window 204 is defined with respect to the time TS of the given authentication event 202. The time window 204 includes the time TS of the authentication event 202. In examples according to FIG. 2, the time window 204 also includes a time interval W1 before the time TS, and a time interval W2 after the time TS. In some examples, W1 is equal to W2. In other examples, W1 is different from W2.

The time window 204 of FIG. 2 starts at time T1 (=TS−W1), and ends at time T2 (=TS+W2). Within the time window 204, various authentication events AE1 and AE2 can occur at the source device (e.g., device 1 in FIG. 1) in the time interval W1 before the time TS of the authentication event 202, and various authentication events AE3, AE4, and AE5 can occur at the destination device (e.g., device 2 in FIG. 1) in the time interval W2 after the time TS.

Event data associated with the authentication events AE1, AE2, AE3, AE4, and AE5 is logged by the logging system 110 (FIG. 1) into the authentication log 112 along with the event data of the given authentication event 202.

In some examples, the values of W1 and W2 can be preset, such as by an administrator or other user. In further examples, the values of W1 and W2 can be learnt by the stolen credential detection engine 116 based on an analysis of past data and based on feedback provided regarding classifications of authentication events by the classifier 118. For example, a user can indicate that a classification made by the classifier 118 is correct or incorrect, and the classifier 118 can use this feedback to update itself.

Figure 3:
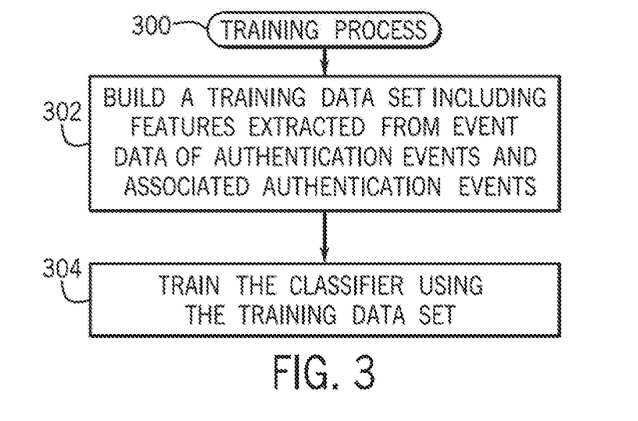
FIG. 3 is a flow diagram of a training process according to some examples.

FIG. 3 is a flow diagram of a training process 300 for training a classifier, according to some examples. The training process 300 can be performed by the stolen credential detection system 114 or by a different system. The training process 300 builds (at 302) a training data set including features extracted from event data of authentication events and associated authentication events. For each respective authentication event of the authentication events, the respective context that includes associated authentication events is determined, and the features of the context are extracted. The extracted features can be provided in corresponding collections of features, where each collection of features can be in the form of a feature vector, for example.

Examples of features that can be extracted from a context of a given authentication event can include any or some combination of the events listed in Table 1 below.

TABLE 1

| | |
|---|---|
| src_sucess | Number of successful authentication events at source device S. |
| src_fail | Number of failed authentication events at source device S. |
| src_srcuser | Number of source users in the authentication events at source device S in time window [TS − W1]. This number is computed by looking at all authentication events at source device S and counting the number of unique source users (based on identifiers of source users) in the authentication events. A source user is a user that initiated an authentication to authenticate the user at source device S. |
| src_dstuser | Number of destination users in the authentication events at source device S in time window [TS − W1]. This number is computed by looking at all authentication events at source device S and counting the number of unique destination users (based on identifiers of destination users) in the authentication events. A destination user is a user that is to be authenticated at source device S, in response to an |

TABLE 1-continued

| | |
|---|---|
| | authentication initiated by another user at another device. |
| src_srcmachine | Number of source machines in the authentication events at source device S in time window [TS − W1]. During the time window [TS − W1], there is a certain number authentication events in which source device S is the destination, i.e., someone is trying to login to source device S from another machine. In these authentication events, a count is maintained of a number unique source machines (that is, how many unique machines are trying to login to source device S). |
| src_dstmachine | Number of destination machines in the authentication events at source device S in [TS − W1]. During the time window [TS − W1], there is a certain number authentication events in which source device S is the source, i.e., someone at source device S is trying to login to destination machines from source device S. In these authentication events, a count is maintained of a number of unique destination machines (that is, how many unique destination machines source device S is trying to login to). |
| src_authsrc | Number of authentication events at source device S in time window [TS − W1] in which the source user appears. |
| src_authdst | Number of authentication events at source device S in time window [TS − W1] in which the destination user appears. |
| dst_sucess | Number of successful authentication events at the destination device D. |
| dst_fail | Number of failed authentication events at the destination device D |
| dst_srcuser | Number of source users in the authentication events at the destination device D in time window [TS + W2]. This number is computed by looking at all authentication events at the destination device D and counting the number of unique source users (based on identifiers of source users) in the authentication events. A source user is a user that initiated an authentication to authenticate the user at the destination device D. |
| dst_dstuser | Number of destination users in the authentication events at the destination device D in time window [TS + W2]. This number is computed by looking at all authentication events at the destination device D and counting the number of unique destination users (based on identifiers of destination users) in the authentication events. A destination user is a user that is to be authenticated at the destination device D, in response to an authentication initiated by another user at another device. |
| dst_srcmachine | Number of source machines in the authentication events at the destination device D in time window [TS + W2]. During the time window [TS + W2], there is a certain number authentication events in which destination device D is the destination, i.e., someone is trying to login to the destination device D from another machine. In these authentication events, a count is maintained of a number unique source machines (that is, how many unique machines are trying to login to destination device D). |
| dest_dstmachine | Number of destination machines in the authentication events at the destination device D in time window [TS + W2]. During the time window [TS + W2], there is a certain number of authentication events in which destination device D is the source, i.e., someone is trying to login to another destination machine from the destination device D). In these authentication events, a count is maintained of a number of unique destination machine (that is, how many unique machines are being logged onto from destination device D). |
| dst_authsrc | Number of authentication events at destination device D in time window [TS + W2] in which the source user appears. |
| dst_authdst | Number of authentication events at destination device D in time window [TS + W2] in which the destination user appears. |

Although specific features derived based on event data of authentication events are listed above, it is noted that in other examples, other types of features can be derived from event data of authentication events.

Each feature vector in the training data set is associated with a classification label, which can be assigned by a user or another classifier. A positive classification label indicates that the respective feature vector is associated with a positive classification for an unauthorized authentication event (i.e., the respective feature vector indicates an unauthorized authentication event), while a negative classification label indicates that the respective feature vector is associated with a negative classification for an unauthorized authentication event (i.e., the respective feature vector indicates a benign authentication event).

The training process 300 then trains (at 304) the classifier using the training data set.

The classifier can be updated in response to a triggering condition. For example, the classifier can be updated periodically (a time-based triggering condition) or in response to a request of an administrator or other user, or a program. Updating the classifier can involve using feedback provided regarding classifications of the classifier to modify the classifier.

Although reference is made to training just one classifier on the training data set built (at 302), it is noted that in alternative examples, multiple classifiers can be trained on the training data set. These multiple classifiers make up an ensemble of classifiers. The different classifiers can be trained using different machine learning techniques, including, as examples, any of the following: logistic regression, random forests, gradient boosting, neural networks, and so forth.

Gradient boosting and random forests are examples of techniques for producing an ensemble of classifiers. Gradient boosting is an ensemble technique where a weighted ensemble of weak models (e.g., shallow trees) are combined to produce the prediction for a classification task. In gradient boosting, the successive models (classifiers) are trained on the gradient of the loss function in a previous iteration.

Random forests include an ensemble of decision trees. The output of a model (classifier) is based on the aggregation of the outputs of all the individual trees. The trees are trained differently, and on a slightly different data set so their outputs are diverse. Each tree is trained on a bootstrap sample of the training data. A bootstrap sample is a sample of the same size as the original data obtained by performing sampling with replacement. Further, during tree construction, at each split a random subset of features is selected, and then the split is performed on the best features among this subset.

The random forests technique is an example of a technique in which different classifiers of an ensemble of classifiers can be trained using respective different samples of the training data set.

Figure 4:
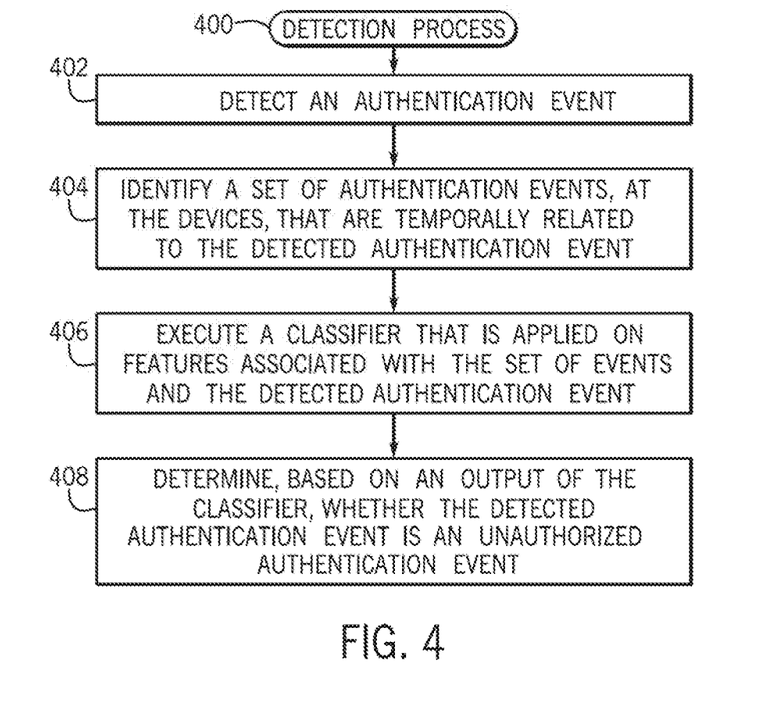
FIG. 4 is a flow diagram of a detection process of detecting unauthorized authentication events, according to some examples.

FIG. 4 is a flow diagram of a detection process 400 of detecting an unauthorized authentication event, according to some examples. The detection process 400 can be performed by the stolen credential detection engine 116, for example. The detection process 400 detects (at 402) an authentication event that includes a user credential submitted between a plurality of devices in a network.

The detection process 400 identifies (at 404) a set of authentication events, at the devices, that are temporally related to the detected authentication event. The authentication event and the set of authentication events make up a context of the authentication event.

The detection process 400 executes (at 406) a classifier (such as one trained according to the training process 300 of FIG. 3) that is applied on features associated with the context including the set of authentication events and the detected authentication event. The features can include those listed in Table 1, according to some examples.

Figure 5:
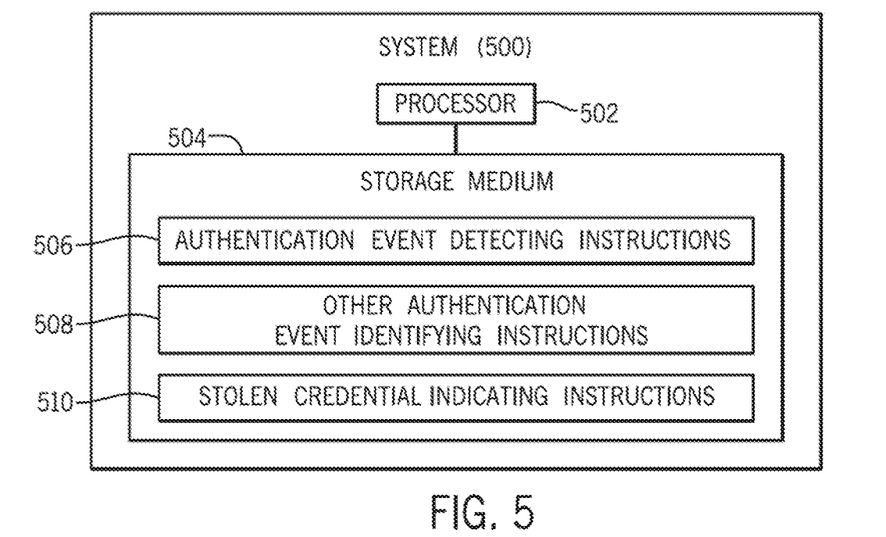
FIG. 5 is a block diagram of a system to detect unauthorized authentication events, according to further examples.

The detection process 400 determines (at 408), based on an output of the classifier, whether the detected authentication event is an unauthorized authentication event FIG. 5 is a block diagram of a system 500 that includes a processor (or multiple processors) 502. The system 500 further includes a non-transitory machine-readable or computer-readable storage medium 504 storing machine-readable instructions that are executable on the processor 502 to perform various tasks. Machine-readable instructions executable on a processor to perform a task can refer to machine-readable instructions executable on a single processor or on multiple processors to perform the task. A processor can include a microprocessor, a core of a multi-core microprocessor, a microcontroller, a programmable integrated circuit, a programmable gate array, or another hardware processing circuit.

The machine-readable instructions include authentication event detecting instructions 506 to detect an authentication event that includes a user credential submitted from a source device to a destination device in a network. The machine-readable instructions further include event identifying instructions 508 to identify other authentication events within a time window including a time of the detected authentication event, the identified other authentication events comprising authentication events of the first device and the second device.

The machine-readable instructions further include stolen credential indicating instructions 510 to indicate occurrence of a stolen credential by an entity in the network based on applying a classifier on information associated with the identified other authentication events.

Figure 6:
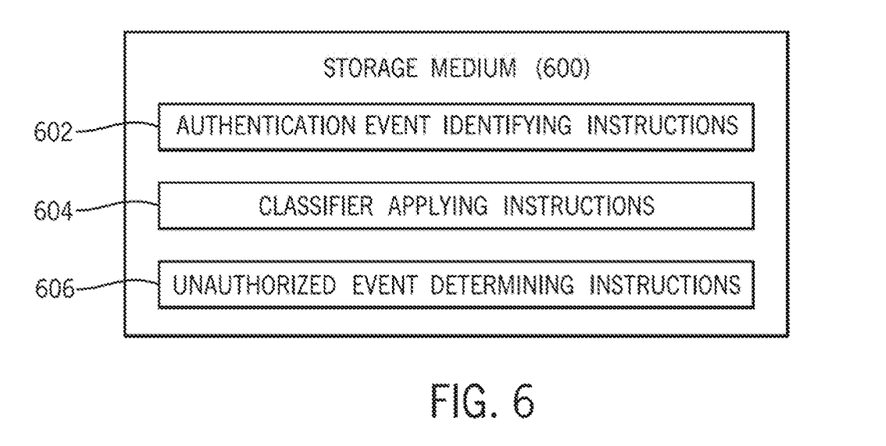
FIG. 6 is a block diagram of a storage medium storing machine-readable instructions for detecting unauthorized authentication events, according to additional examples.

FIG. 6 is a block diagram of a non-transitory machine-readable or computer-readable storage medium 600 that stores machine-readable instructions executable by a system to perform various tasks. The machine-readable instructions include authentication event identifying instructions 602 to identify, for a given authentication event between a plurality of devices in a network, a set of authentication events, at the devices, that are temporally related to the given authentication event. The machine-readable instructions include classifier applying instructions 604 to apply a classifier on a collection of features associated with the set of authentication events. The machine-readable instructions further include unauthorized authentication event determining instructions 606 to determine, based on an output of the classifier, whether the given authentication event is an unauthorized authentication evented events.

The storage medium 504 (FIG. 5) or 600 (FIG. 6) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site (e.g., a cloud) from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium storing instructions that upon execution cause a processor of a system to:
   detect that a given authentication event occurred at a particular time from a source device to a destination device in a network;
   in response to detecting the given authentication event, identify a context for the given authentication event comprising failed authentication events that occurred at the source device during a first predetermined time interval before the particular time of the given authentication event and failed authentication events that occurred at the destination device during a second predetermined time interval after the particular time of the given authentication event;
   apply a classifier on features derived from the context for the given authentication event, wherein the features derived from the context for the given authentication event comprise a total number of the failed authentication events that occurred at the source device during the first predetermined time interval and a total number of the failed authentication events that occurred at the destination device during the second predetermined time interval;
   determine, based on an output of the classifier, whether the given authentication event is an unauthorized authentication event; and
   cause, in response to determining that the given authentication event is an unauthorized authentication event, a halt of an activity at one or more of the source device and the destination device.

2. The non-transitory machine-readable storage medium of claim 1, wherein the failed authentication events occurred during the first predetermined time interval and the failed authentication events occurred during the second predetermined time interval are identified from authentication logs stored in a logging system.

3. The non-transitory machine-readable storage medium of claim 1, wherein a length of the first predetermined time interval is equal to a length of the second predetermined time interval.

4. The non-transitory machine-readable storage medium of claim 1, wherein a length of the first predetermined time interval and a length of the second predetermined time interval are based on historical data.

5. The non-transitory machine-readable storage medium of claim 1, wherein the given authentication event comprises a user credential submitted from the source device to the destination device, and wherein the features derived from the context for the given authentication event further comprise a count of a number of plural users that initiated authentications from the destination device to other devices, and a count of a number of plural users that are authenticated at the destination device in response to authentications initiated at the other devices.

6. The non-transitory machine-readable storage medium of claim 1, wherein the context for the given authentication event further comprises:
- a count of a number of plural users that initiated authentications from the source device to other devices and a count of a number of plural users that are authenticated at the source device in response to authentications initiated at the other devices during the first predetermined time interval before the particular time of the given authentication event, and
- a count of a number of plural users that initiated authentications from the destination device to the other devices, and a count of a number of plural users authenticated at the destination device in response to authentications initiated at the other devices during the second predetermined time interval after the particular time of the given authentication event.

7. The non-transitory machine-readable storage medium of claim 1, wherein the features derived from the context for the given authentication event further comprise a count of a number of plural machines attempting to login to the source device, and a count of a number of plural machines to which the source device attempted to login.

8. The non-transitory machine-readable storage medium of claim 1, wherein the given authentication event comprises a user credential submitted from the source device to the destination device, and wherein the features derived from the context for the given authentication event further comprise a count of a number of plural machines attempting to login to the destination device, and a count of a number of plural machines to which the destination device attempted to login.

9. The non-transitory machine-readable storage medium of claim 1, wherein the instructions that cause the processor to apply the classifier on the features derived from the context for the given authentication event include instructions that cause the processor to apply an ensemble of classifiers on the features derived from the context for the given authentication event.

10. The non-transitory machine-readable storage medium of claim 9, wherein the ensemble of classifiers comprise classifiers derived according to different machine learning techniques.

11. The non-transitory machine-readable storage medium of claim 9, wherein the ensemble of classifiers comprise classifiers trained using respective different samples of a labeled data set.

12. The non-transitory machine-readable storage medium of claim 1, wherein the instructions upon execution cause the processor of the system to:
- build a training data set including extracted features that are extracted from a plurality of authentication events stored in a logging system and associated authentication events of the plurality of authentication events; and
- train the classifier using the extracted features in the training data set.

13. A system comprising:
a processor; and
a non-transitory storage medium storing instructions that are executable to cause the processor to:
- detect an authentication event that includes a user credential submitted at a particular time from a source device to a destination device in a network;
- in response to the detected authentication event, identify other authentication events that occurred at the source device and the destination device within a time window including the particular time of the detected authentication event, the identified other authentication events comprising failed authentication events that occurred at the source device during a first predetermined time interval before the particular time of the detected authentication event and failed authentication events occurred at the destination device during a second predetermined time interval after the particular time of the detected authentication event;
- detect occurrence of a stolen credential by an entity in the network based on applying a classifier on features derived from the identified other authentication events, wherein the features derived from the identified other authentication events comprise a total number of the failed authentication events that occurred at the source device during the first predetermined time interval and a total number of the failed authentication events that occurred at the destination device during the second predetermined time interval; and
- cause, in response to detecting the occurrence of the stolen credential, a halt of an activity at one or more of the source device and the destination device.

14. The system of claim 13, wherein the classifier is part of an ensemble of classifiers, and wherein the instructions are executable to cause the processor to:
train the classifiers of the ensemble of classifiers using different samples from a labeled data set.

15. The system of claim 14, wherein the instructions that cause the processor to apply the classifier comprise instructions that cause the processor to apply the ensemble of classifiers on the identified other authentication events to detect the occurrence of the stolen credential.

16. The system of claim 13, wherein the instructions that cause the processor to identify the other authentication events that occurred at the source device and the destination device during the time window comprise instructions that cause the processor to:
- determine a count of a number of plural machines attempting to login to the source device and a count of a number of plural machines to which the source device attempted to login during the first predetermined time interval, and
- determine a count of a number of plural machines attempting to login to the destination device and a count of a number of plural machines to which the destination device attempted to login during the second predetermined time interval.

17. A method comprising:
- detecting, by a system comprising a hardware processor, an authentication event that includes a user credential submitted at a particular time from a source device to a destination device in a network;
- in response to the detected authentication event, identifying, by the system, other authentication events that occurred at the source device and the destination device within a time window including the particular time of the detected authentication event, the identified other authentication events comprising failed authentication events that occurred at the source device during a first predetermined time interval before the particular time of the detected authentication event and failed authentication events that occurred at the destination device during a second predetermined time interval after the particular time of the detected authentication event;
- executing, by the system, a classifier that is applied on features derived from the identified other authentication events, wherein the features derived from the identified other authentication events comprise a total number of the failed authentication events that occurred at the source device during the first predetermined time interval and a total number of the failed authentication events that occurred at the destination device during the second predetermined time interval;

determining, by the system based on an output of the classifier, whether the detected authentication event is an unauthorized authentication event; and cause, by the system in response to determining that the detected authentication event is an unauthorized authentication event, a halt of an activity at one or more of the source device and the destination device.

18. The method of claim 17, wherein identifying the other authentication events that occurred at the source device and the destination device within the time window further comprises:

determining a count of a number of plural machines attempting to login to the source device and a count of a number of plural machines to which the source device attempted to login during the first predetermined time interval, and determining a count of a number of plural machines attempting to login to the destination device and a count of a number of plural machines to which the destination device attempted to login during the second predetermined time interval.

\* \* \* \* \*